United States Patent
Francisco et al.

(10) Patent No.: US 8,292,088 B2
(45) Date of Patent: Oct. 23, 2012

(54) WATER SUPPLY SYSTEM WITH FILTRATION AND RETROFIT ASSEMBLY

(75) Inventors: Michael H. Francisco, Menlo Park, CA (US); Sumeet Mehra, Mumbai (IN); Subhash Mehra, Mumbai (IN)

(73) Assignee: Acuity/Sparkle, Ltd. (Cayman), Grand Cayman (KY)

( * ) Notice: Subject to any disclaimer, the term of this patent is extended or adjusted under 35 U.S.C. 154(b) by 1000 days.

(21) Appl. No.: 12/253,425

(22) Filed: Oct. 17, 2008

(65) Prior Publication Data

US 2009/0127171 A1    May 21, 2009

Related U.S. Application Data

(60) Provisional application No. 60/980,749, filed on Oct. 17, 2007.

(51) Int. Cl.
- B01D 24/00 (2006.01)
- B01D 25/00 (2006.01)
- B01D 63/00 (2006.01)
- C02F 1/00 (2006.01)
- B01D 61/00 (2006.01)

(52) U.S. Cl. ............... 210/416.3; 210/257.1; 210/257.2; 210/416.1; 210/652

(58) Field of Classification Search .......... 210/650–652, 210/195.1, 257.2, 416.1, 416.3, 767, 257.1
See application file for complete search history.

(56) References Cited

U.S. PATENT DOCUMENTS

| | | | | |
|---|---|---|---|---|
| 1,029,580 A | * | 6/1912 | Bane | 74/592 |
| 3,295,454 A | * | 1/1967 | Plum et al. | 417/249 |
| 3,558,242 A | * | 1/1971 | Jenkins-Thomas | 417/374 |
| 3,749,524 A | * | 7/1973 | Jordan | 417/323 |
| 4,124,488 A | * | 11/1978 | Wilson | 210/134 |
| 4,288,326 A | * | 9/1981 | Keefer | 210/637 |
| 4,367,140 A | * | 1/1983 | Wilson | 210/110 |
| 4,477,347 A | * | 10/1984 | Sylva | 210/232 |
| RE32,144 E | * | 5/1986 | Keefer | 210/637 |
| 4,724,079 A | * | 2/1988 | Sale et al. | 210/638 |
| 4,853,204 A | * | 8/1989 | Azuma et al. | 423/344 |
| 5,429,193 A | | 7/1995 | Hegebarth et al. | |
| 5,496,466 A | * | 3/1996 | Gray | 210/137 |
| 5,531,887 A | * | 7/1996 | Miers | 210/135 |
| 5,589,066 A | | 12/1996 | Gray | |

(Continued)

FOREIGN PATENT DOCUMENTS

JP    2002-346342 A2    12/2002

*Primary Examiner* — Ana Fortuna

(74) *Attorney, Agent, or Firm* — Schneck & Schneck; David M. Schneck

(57) ABSTRACT

A water supply system in accordance with the invention includes pumping in which there is a mechanical co-dependency between the generations of liquid-draw pressure and filtration-drive pressure, but a hydraulic dependency of the application of the filtration-drive pressure upon release of water from the liquid-draw pressure. In one preferred embodiment, the system is enabled by a retrofit assembly in which a second, filtration-drive pump is mechanically connected to the pump handle of a water intake pump. The retrofit assembly may include multiple arms and hinge points for coupling the second pump to the pump handle, as well as a flow path from the output of the water intake pump to the input of the second pump and a flow path from the second pump to a filtration system. The flow path between the two pumps typically includes an unfiltered water outlet.

19 Claims, 4 Drawing Sheets

U.S. PATENT DOCUMENTS

| | | |
|---|---|---|
| 6,348,155 B1 | 2/2002 | Conway et al. |
| 6,402,949 B1 | 6/2002 | Banks |
| 6,461,513 B1 | 10/2002 | Jen |
| 7,297,268 B2 | 11/2007 | Herrington et al. |
| 7,510,658 B2 * | 3/2009 | Gordon .................. 210/652 |
| 2008/0203025 A1 | 8/2008 | Francisco et al. |

* cited by examiner

WATER SUPPLY SYSTEM WITH FILTRATION AND RETROFIT ASSEMBLY

CROSS-REFERENCE TO RELATED APPLICATION

This application claims priority from U.S. provisional application Ser. No. 60/980,749, filed Oct. 17, 2007.

TECHNICAL FIELD

The present invention relates generally to apparatus for producing purified drinking water from ground or surface water when the only or the most convenient energy source is a hand-operated pump.

BACKGROUND ART

Potable (i.e., drinkable) water is a necessity to which millions of people throughout the world have limited access. Water is often considered to be the most basic and accessible element of life, and seemingly the most plentiful. In every liter of water in rivers or lakes, fifty more lie buried in vast aquifers beneath the surface of the earth. There is no standard for the quantity of water a person needs each day but experts often place the minimum at 100 liters for adults. Most people drink one or two liters, with the rest typically being used for cooking, bathing, and sanitation. Adult Americans consume between 400 and 600 liters of water each day.

The population of earth continues to expand. If water were spread evenly across the globe, it is likely that there would be a sufficient quantity to satisfy the needs of everyone. However, rain falls inequitably with respect to both time and geographical location. Delhi receives fewer than forty days of rain each year, all in less than four months. In other Indian cities, the situation is worse. Nevertheless, the country must sustain nearly twenty percent of the earth's population with four percent of its water. China has less water than Canada, but contains forty times as many people.

In addition to receiving a majority of its rainfall over the span of only a few months, most of the people of Indian reside in hardrock areas, where underground water is difficult to reach. The problems became known worldwide in the 1960s, when a series of severe droughts throughout India resulted in a large number of deaths. In response, the United Nations provided drilling equipment that greatly expanded the number of boreholes through the hardrock to the underline groundwater. Even with the significant increase in the number of boreholes, the goal of making water an accessible commodity for the Indian people was problematic, since the number and the quality of the available hand pumps were inadequate. Most of the hand pumps in India in the 1960s and the early 1970s were poor-quality cast-iron replicas of European and American pumps that were not designed for use by an entire community. What were needed were VLOM (Village Level Operation and Maintenance) pumps for use in areas in which electrical power is not readily available. As indicated by its name, a VLOM is intended for use by a number of people and should be maintainable by a local mechanic.

In 1975, UNICEF (United Nations International Children's Emergency Fund), along with the Indian government, identified the Sholapur pump as the hand pump which would be modified for the purpose of facilitating mass production and local upkeep. The modified hand pump is referred to as the "India Mark II." The design is non-proprietary, includes standardized specifications and replacement parts, and is formed of steel, rather than cast iron.

A representation of the India Mark II as shown in FIG. 1. The hand pump 120 includes a handle 122 that is pivotally connected within a head 124. A removable cover 126 allows access to mechanical components within the head, so that repairs may be made when necessary. A stand assembly 128 includes three legs 130, but only two are shown in FIG. 1. Typically, the stand assembly is at least partially buried following installation of the hand pump. A water tank 132 leads to the outlet 134 of the hand pump. Buried components, such as the cylinder assembly and plunger rod are not illustrated. When a person pumps the handle 122 upwardly and downwardly, water is drawn through a well casing 136 to the water tank 132 and is released through the outlet. Mass production of the India Mark II started in 1977 at an annual rate of 7,200. According to UNICEF information, by 1984, 36 manufacturers were producing 100,000 pumps per year, with the annual production increasing to 200,000 by 1987. It is estimated that approximately 50,000 new pumps are installed in India each year. Moreover, the India Mark II has been exported to countries in Africa and Latin America and has been viewed as the answer to a decentralized water system. The hand pump remains relatively the same, but upgrades to the Mark III and Mark IV are available.

The availability of the India Mark II and other hand pumps has greatly improved conditions within India and other regions of the world. However, producing water that is sufficiently pure for human consumption remains as a major concern. It is not possible to determine from its appearance whether pump-acquired water is safe to drink. Simple procedures, such as boiling or use of a household charcoal filter, are not sufficient for treating water from an unknown source. Even natural spring water should be tested before determining what type of treatment is needed. Brackish water is water that has up to 2,000-5,000 ppm (parts per million) total dissolved solids (TDS). "Mildly" brackish water has a TDS of about 500-1,000 ppm. Drinking water specifications (IS: 10500-1191) include identifications of both the recommended and "acceptable" levels: a TDS of 500 ppm (up to 2,000 ppm, if no other source is available); 0.3 ppm iron (up to 1.0 ppm); 1.0 ppm fluoride (up to 1.5 ppm); 0.05 ppm arsenic; 0.03 ppm aluminum (up to 0.2 ppm); with a ph of 6.5-8.5.

There is no source of water which is considered inherently "safe" for drinking. Deep groundwater is generally of high bacteriological quality (i.e., a low concentration of pathogenic bacteria, such as *campylobacter* or the pathogenic protozoa *Cryptosporidium* and *Giardia*), but may be rich in dissolved solids, especially carbonates and sulfates of calcium and magnesium. In comparison, the bacteriological quality of shallow groundwater varies significantly. Arsenic contamination of shallow groundwater is a serious problem in some areas, notably Bangladesh and West Bengal in the Ganges Delta. Fluoride is also a potentially dangerous contaminant, possibly leading to Flourosis, a serious bone disease.

Water which is acquired using a pump or other means should then be purified. There are known processes for water purification. The selection among the processes is based upon the particular contaminants present in a water supply. Ultrafiltration membranes use polymer films with chemically formed microscopic pores that can be used in place of granular media to filter water effectively without coagulants. The type of membrane media determines how much pressure is needed to drive the water through the media and determines the size of micro-organisms which are filtered by the media. In ultrafiltration, ultrastatic pressure forces a liquid against a semi-permeable membrane. Suspended solids and solutes of high molecular weight are retained up to about 0.01 microns in size. This removes bacteria and many viruses, but not salts (ions), while water and low molecular weight solutes pass through the membrane.

Another membrane technology for water purification is reverse osmosis. Reverse osmosis is the process of pushing a solution through a filter that traps the solute on one side and allows the pure solvent to be obtained from the other side. A reverse osmosis membrane is semipermeable, meaning it allows the passage of solvent but not solute, down to a particle size of approximately 0.0005 microns, which is sufficient to remove viruses and salts (ions). The membranes used for reverse osmosis have no pores. Rather, the separation takes place in a dense polymer layer of only microscopic thickness. Water goes into solution in the polymer of which the membrane is manufactured, and crosses the polymer by diffusion. This process normally requires a high pressure to be exerted on the high concentration side of the membrane, usually 4-14 bar (60-200 pounds per square inch (psi)) for fresh and brackish water and 40-70 bar (600-1,000 psi) for salt water, which has approximately 24 bar (350 psi) natural osmodic pressure that must be overcome.

Thus, there are a number of interrelated problems with providing human consumable water. The first issue is providing access to a water source. The India Mark II has been instrumental in addressing this first issue. Then, issues arise regarding purification. In the developing regions in which the India Mark II is most beneficial and in regions in which a natural disaster has occurred, there may be no power source available to produce the pressure necessary for reliable filtration. There are commercially available hand pumps which generate sufficient pressure, but for a community-shared India Mark II, the time requirements and the expense of a second, slower functioning pump may dictate against this second shared pump.

SUMMARY OF THE INVENTION

A hand pump in accordance with the invention includes a pumping capability that is responsive to motion of a pump handle both for generating a liquid-draw pressure at a water intake and for subsequently and separately applying a filtration-drive pressure to the water which entered the hand pump. A filter is connected to receive the water to which the filtration-drive pressure was applied. The hand pump includes two outlets. A filtered outlet is connected downstream of the filter to deliver filtered water. On the other hand, an unfiltered outlet is connected upstream of the application of the filtration-drive pressure to deliver unfiltered water following the release of the liquid-draw pressure.

In one preferred embodiment, such a water supply system is enabled by a retrofit assembly designed to be coupled to a known water intake pump, particularly one within the India Mark Series. The retrofit assembly includes a second pump having an input and an output. This second pump provides the filtration-drive pressure. The retrofit assembly also includes coupling for mechanically connecting the second pump to the handle, such that motion of the handle operates both pumps. This coupling may include multiple arms and multiple hinge points. Piping provides a flow path between the water intake pump and the input of the second pump. The output of the second pump is connected to a filter which has the filtered water outlet. In the preferred embodiment, the flow path piping between the two pumps includes the unfiltered water outlet which is located to provide ready access to unfiltered water.

Both the intake pump and the second, filtration-drive pump may be positive displacement pumps, with the coupling to the handle being such that motion of the handle in one direction generates the liquid-draw pressure by the intake pump, while motion in the opposite direction generates the filtration-drive pressure by the second pump. While the water supply system is well-suited for use of an India Mark Series pump as the input pump, similar pumps may be incorporated into the system, or the pump may be one that uses semi-rotary hand motion, such as the pump available through Venus Pump & Engineering Works of India.

In one embodiment of the invention, the filter includes an ultrafiltration cartridge. A suitable pore size for the pores within an ultrafiltration membrane is 5 microns or less. Alternatively or additionally, the filter may include at least one reverse osmosis cartridge.

As noted, the flow path between the water intake pump and the second, filtration-drive pump may include an unfiltered outlet. Particularly where the water supply system is used primarily to first acquire and then purify salt water, the water released from the unfiltered outlet may have a number of suitable applications, while the water released from the filtered outlet is reserved for drinking, cooking, and similar purposes. Particularly where the retrofit assembly is connected to an India Mark Series pump, the volumetric output capacity of the intake pump will exceed that of the second pump. The unfiltered outlet may be located to enable easy access to the excess water.

DETAILED DESCRIPTION

Figure 1:
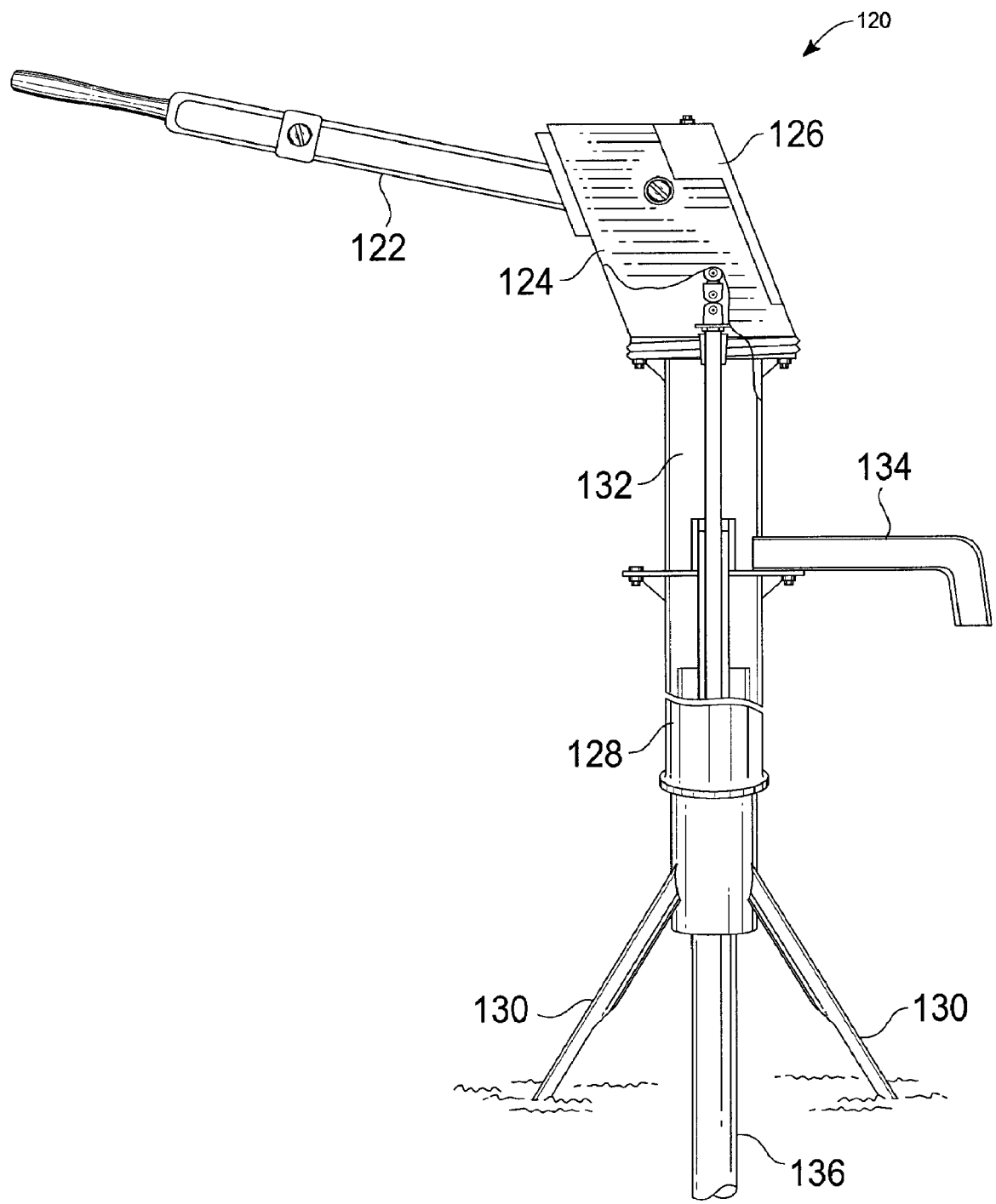
FIG. 1 is a side, partially cutaway view of an India Mark II pump.
Figure 2:
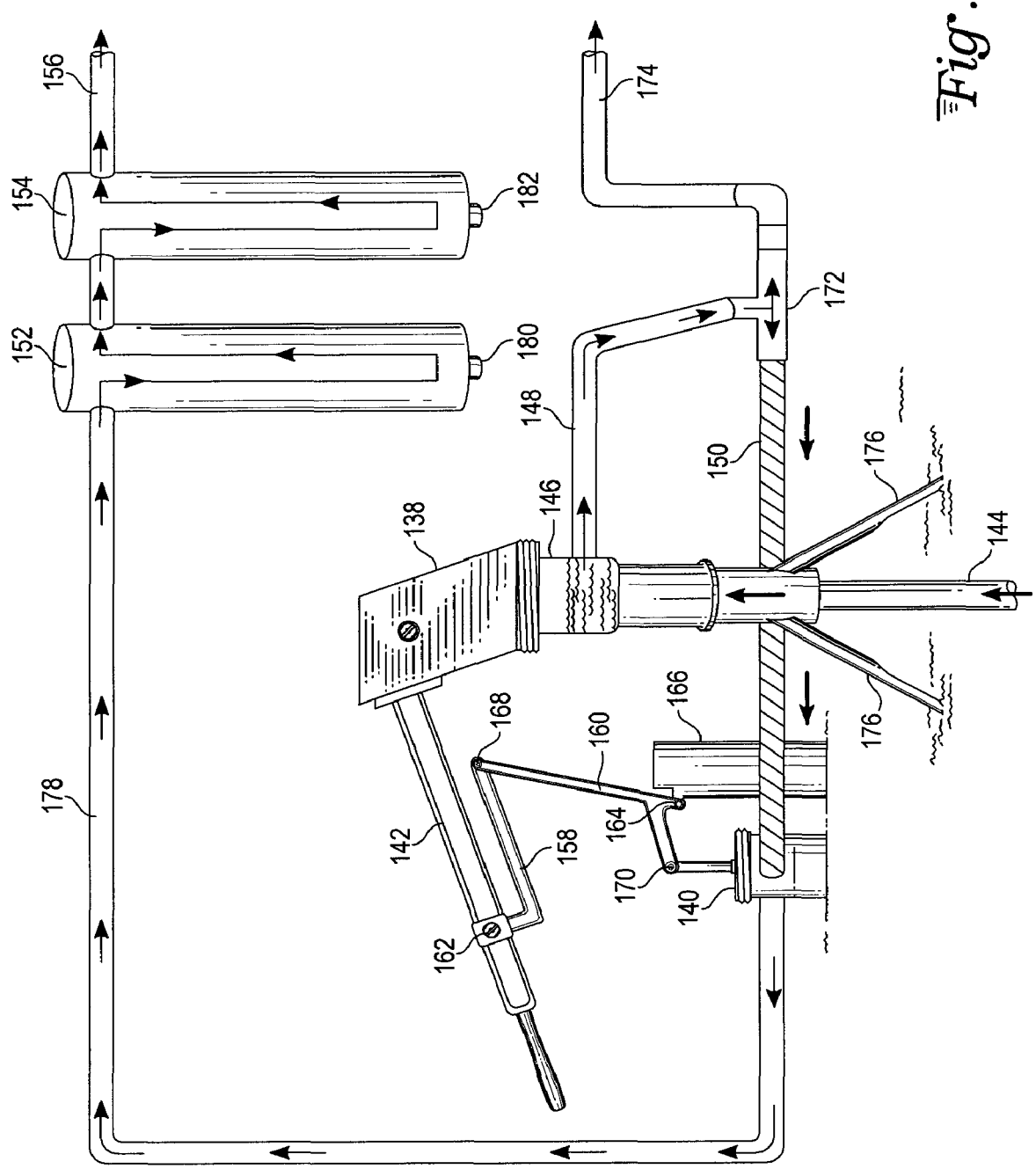
FIG. 2 is an illustration of a water supply system in accordance with one embodiment of the invention.

FIG. 2 illustrates one embodiment of a water supply system in which there is a mechanical co-dependence between the generations of a liquid-draw pressure and a filtration-drive pressure, but a hydraulic dependence of the application of the filtration-drive pressure upon release of water from the liquid-draw pressure. In this embodiment, the application of the filtration-drive pressure to unfiltered water is dependent upon a water flow path between two pumps 138, 140 that are separately connected to a pump handle 142. When the handle is cycled through a number of strokes, liquid is drawn through an intake 144 to a water tank 146, the water is gravity-fed to the second pump 140 through a pair of pipes 148, 150, and the second pump generates the filtration-drive pressure which causes flow through a pair of filter cartridges 152, 154 to a filtered water outlet 156.

In the embodiment of FIG. 2, the second pump 140 is connected as a component of a retrofit assembly for a known water intake pump 138. In one preferred application, the pump 138 is an "India Mark Series hand pump," which is defined herein as a pump modeled on the basis of the non-proprietary India Mark II of the 1970s. The India Mark Series includes the Mark II, Mark III, and Mark IV. In other applications, the retrofit assembly is mechanically coupled to a semi-rotary pump.

The second, filtration-drive pump 140 is mechanically coupled to the pump handle 142 by means of a fixed arm 158 and a pivoting arm 160. The fixed arm extends parallel to the pump handle. The length of the fixed arm and its position along the pump handle determine the difference in the stroke applied to the first pump 138 and the stroke applied to the second pump 140. The fixed arm is connected to the pump handle by a clamp 162, which allows some position adjustability.

The pivoting arm 160 is connected to a hinge 164 of a mounting post 166. The arm 160 functions in the manner of a lever and includes pivot connections 168, 170 at its two ends. Consequently, as the pump handle 142 is moved upwardly and downwardly, the connection to the second pump via the two arms provides the pumping operation that generates the filtration-drive pressure. Preferably, the connections of the two pumps to the pump handle are such that pumping occurs on opposite strokes. That is, the time in which force is applied to generate the liquid-draw pressure by the pump 138 is separate from the time required for applying force to generate the filtration-drive pressure by the pump 140.

The water-intake pump 138 is a positive displacement pump. Consequently, there is a constant outlet flow during pumping of the handle 142. This flow provides a gravity feed to the filtration-drive pump 140. Pipe 148 is connected to pipe 150 at a T-coupler 172. Typically, the volumetric output capacity of the first pump 138 is significantly greater than that of the second pump. Thus, excess water is allowed to flow to a readily accessible unfiltered water outlet 174, where the released water is available for purposes other than consumption. For example, if the filtration at the cartridges 152, 154 is designed primarily for desalinization, the brackish water that is delivered at the outlet 174 will have uses, such as hand washing, that are not adversely affected by salt content. The output capacities of India Mark Series pumps are typically in the range of 600-900 liters per hour. On the other hand, the output capacity of the second pump may be intentionally limited to 300 liters per hour.

In FIG. 2, the water-intake pump 138 is mounted by using legs 176. There may be three legs that are completely or partially buried in ground or cement. While the intake 144 is shown as extending into the ground, the water supply system may be used to acquire and filter deep groundwater, shallow groundwater, or surface water. The mounting post 166 for the second pump should be fixed in position, such as by partial burial. The second pump 140 should be fixed in position relative to the mounting post.

In operation, movement of the pump handle 142 draws water through the intake 144 to the water tank 146. Then, the water is directed to both the second pump 140 and the unfiltered water outlet 174. The gravity feed is preferential to the pump 140, since the unfiltered water outlet is at a level higher than that of the inlet to the second pump. Since the second pump is mechanically coupled to the pump handle via the arms 158, 160, water which reaches the inlet of the second pump is available for pumping into the piping 178 that establishes a flow path to the two filter cartridges 152, 154. The number of cartridges and the functions of the cartridges are factors which are dependent upon the required filtration, as will be explained in detail below. Following filtration, the water is delivered via the outlet 156. In addition, to the filtered water outlet 156 and unfiltered water outlet 174, the cartridges 152 and 154 typically include outlets for removal of filtered contaminants. This allows the cartridges to be backflushed periodically. These outlets are represented by features 180 and 182 in FIG. 2.

Merely by way of example, the second pump 140 may be a modified version of model DS 1208 sold by Venus Pump & Engineering Works of India. The specifications of this pump indicate a flow rate greater than desired. To retain the pressure in the pump so as not to exceed 4 bar (approximately 60 psi), a built-in check valve may be provided within the suction side of the pump body.

Figure 3:
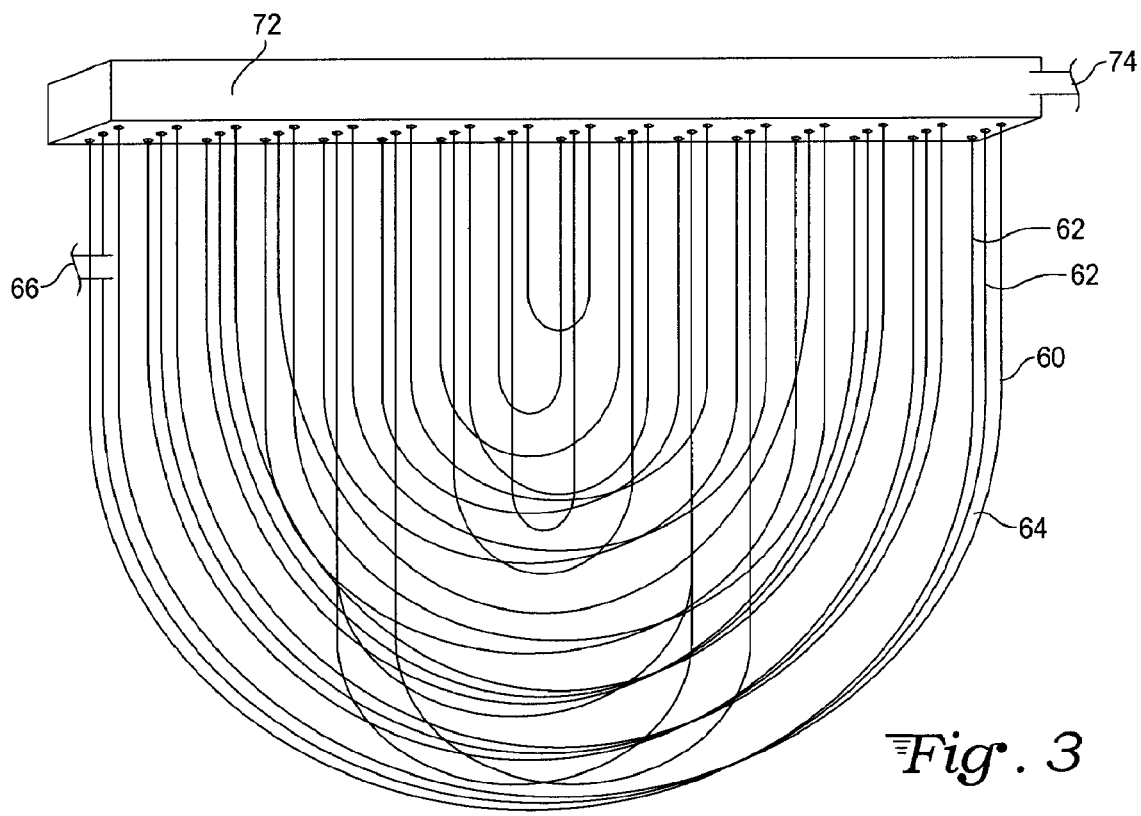
FIG. 3 is a cross-sectional view of an ultrafiltration cartridge for use in the water supply system of FIG. 2.
Figure 4:
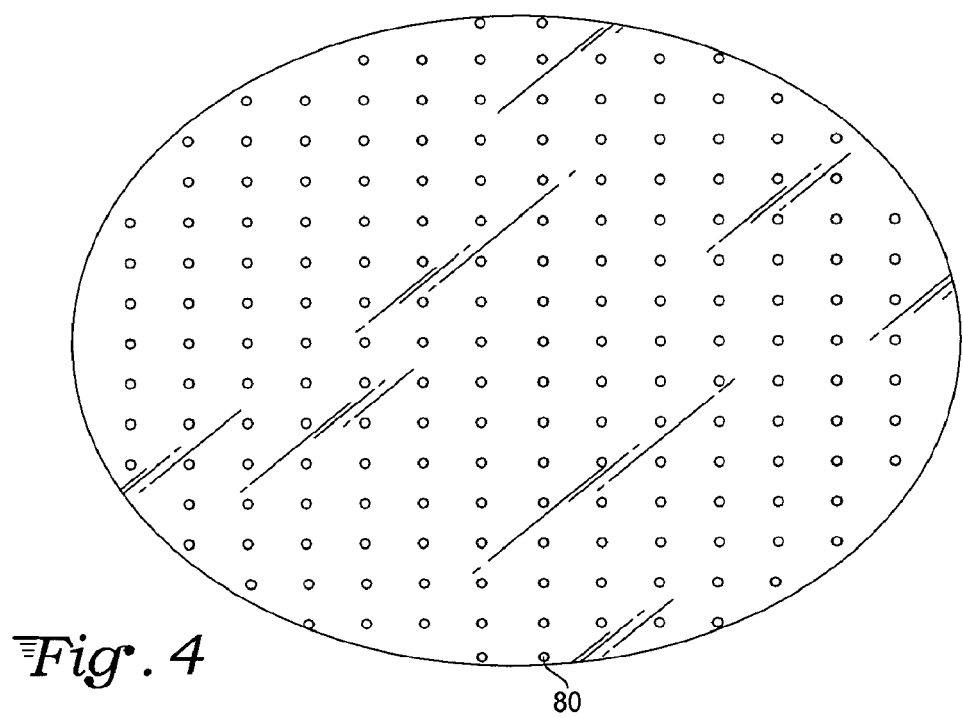
FIG. 4 is an exploded view of part of the filter cartridge shown in FIG. 3.

FIGS. 3 and 4 illustrate one embodiment of filtration components of a suitable ultrafiltration cartridge. FIG. 4 is merely the membrane-holding disc 80, while FIG. 3 shows a number of membranes 62. These membranes may be formed of Ultra-Flo DUC 108 ultrafiltration membrane from Ultra-Flo PTE Ltd., 2 Tuas Avenue 10, Singapore 639126. This filtration membrane is exemplary, other filters may be used. For some embodiments the specifications for this filter are minimal standards, any other filter meeting or exceeding these specifications would be an acceptable substitute. The opposite ends of each membrane are secured to openings within the oval disc, which may remain in this shape or may be cut to a desired shape at any of a number of fabrication stages. FIG. 3 illustrates a rectangular configuration of a cartridge lid 72.

The membranes 62 are exposed within a chamber 64 defined by a housing 6Q. The chamber is enclosed, other than via an inlet 66. In operation, the unfiltered water is directed through the inlet. The membranes 62 have pores with a desired pore size, such as a pore size of 5 microns or less. Water will pass through the pores into the interior of the membranes, but contaminants larger than the dimensions to the pores will be retained within the chamber. The membranes are tubes and the two ends of the membranes are unblocked, so that the water passing into the membranes may enter the lid 72 and flow to an outlet 74.

The inlet 66 and the outlet 74 may be configured for connection to other components. For example, one or both of the inlet or outlet may be threaded for attachment to a valve which is used to regulate flow. As noted, contaminants larger than the pore size remain within the interior of the chamber 64 of the housing 60. These contaminants are periodically removed by backflushing the ultrafiltration cartridge.

Figure 5:
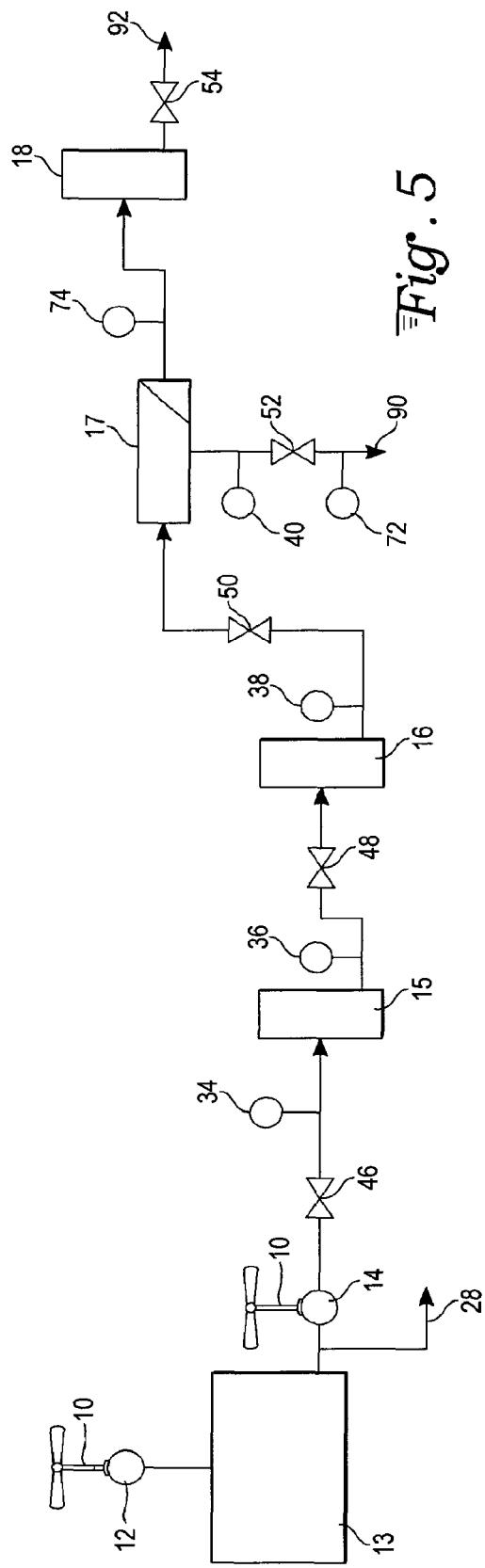
FIG. 5 is a schematic view of a water supply system of the present invention with an ultrafiltration unit and a single reverse osmosis filtration unit.

Referring now to FIG. 5, one embodiment of the invention is depicted. This drawing shows the water flow order of the elements, though not their precise location. Water is provided to a water tank 13 of a hand pump 12 with a reciprocating handle 10. The raw water may have bacteria, particulates, foreign molecules and compounds, dirt, organisms, and, therefore, is not suitable for drinking by humans.

The unfiltered water within the water tank 13 of the water-intake pump 12 is gravity-fed to the second, filtration-drive pump 14, which is co-dependent upon the reciprocation motion of the pump handle 10. Excess water is released via unfiltered water outlet 28.

As described with reference to FIG. 2, this second pump provides the filtration-drive pressure into the subsystem that includes filtration components. In one embodiment, this second pump is a model BS 1208 sold by Venus Pump & Engineering Works of India, but with a built-in check valve to restrict the pressure to a maximum of 4 bar.

Optional pressure gauges 34, 36, 38, 40, 72, 74, are located throughout the system. Elements of the system are selected such that the second hand pump 14 can be operated to provide sufficient pressure to direct the pump's volume of water through the filtration system. In one embodiment, the water next passes through valve 46 to a preliminary cartridge filter 15 having a porosity of about 5 microns to remove relatively large contaminants from the water.

Preferably, the water then is pumped through valve 48 into ultrafiltration unit 16. The water then passes through valve 50 and reaches a reverse osmosis unit 17, at which point the pressure must be approximately 20-25 psi (1.38-1.72 bar), preferably around 22.5 psi (1.53 bar). An adjustable portion of the water (depending on what is referred to as the "recovery rate") is rejected from the reverse osmosis unit, through valve 52 and past flow meter 72 through the reject water outlet 90. The use of valve 52 in conjunction with pressure gauge 40 allows maintenance of the desired pressure, protective of the system. The remainder of the water, the "purified" portion, then optionally passes flow meter 74 through an activated carbon filter 18 before it emerges past valve 54 to the fresh water outlet 92 as potable water.

When the system is closed (i.e., no water is being released), a pressure as great as 60 psi (4 bar) may be generated with the hand pump. When water is being released, the system operates at pressure of about 32-40 psi (2.2-2.76 bar). Approximately 7 psi (0.48 bar) is lost at the 5 micron prefilter, and an additional 7 psi is lost during the ultrafiltration, so the pressure at the entrance to the reverse osmosis unit is approximately 1.38-1.72 bar. It is believed that a minimum pressure of approximately 1.38 bar must be present at the entrance to the reverse osmosis membrane. A human-powered hand pump cannot generate beyond about 1.72 bar, or the fatigue level is reached very quickly.

The ultrafiltration units used in the preferred embodiment are made from Ultra-Flo DUC 108 ultrafiltration membrane from Ultra-Flo PTE Ltd. Initially, the system used ultrafiltration units capable of processing up to 15-20 liters water per hour. To reach the specification of the reverse osmosis membrane, with a feed of approximately 270 liters per hour, 15 to 20 ultrafiltration units were connected in parallel (i.e., the water flow was divided into 15-20 separate units for simultaneous processing) and then recombined into a single flow for entry into the reverse osmosis unit. Element 16 in FIG. 3, therefore, may be a combination of ultrafiltration units, or a single, larger capacity ultrafiltration unit. In an alternate preferred embodiment, a single ultrafiltration unit capable of greater than 600 liters per hour is used.

In an early water supply system based on the preferred embodiment of FIG. 5, the reverse osmosis unit 17 was a Dow 4040 filter (10.16 cm diameter, 101.6 cm long). Operating parameters by the manufacturer are 225 psi (maximum pressure 600 psi). Therefore, the operation of the present invention involves pressures substantially lower than those recommended, or even thought possible, with the commercial unit. The Dow 4040 is rated with a 99.5% average NaCl rejection, with a 99% minimum rejection. During operation at low pressure, however, the NaCl rejection percentage is expected to drop, but still be sufficient to provide potable water as defined by the IS standards.

In operation, the outlet valves from the reverse osmosis unit 17 are set to an approximately 15% recovery rate, preferably approximately 15-20%, as recommended by the manufacturer. The recovery rate is the amount of "purified" water from the reverse osmosis unit as a percentage of the water introduced into the apparatus. Thus, about 85% of the feed water is lost as rejected water from the reverse osmosis unit. In practice, however, it is possible to exceed the manufacturer's suggested recovery rate and obtain an even larger amount of purified water without sacrificing reverse osmosis membrane lifespan because, even at the higher recovery rate, the pressure within the reverse osmosis membrane is still far below the pressure allowed by the specifications. If the recovery rate were greater than 15% when operated at 200-600 psi in accordance with the manufacturer's specification, the reverse osmosis unit would be more susceptible to damage, and would have a greatly decreased expected lifespan. Therefore, according to the invention, the recovery rate is preferably 15-20%, alternatively 15-50%, alternatively 20-40%, and alternatively 25-35%. Preferred alternative recovery rates are approximately 20%, approximately 25%, approximately 30%, approximately 35%, approximately 40%, approximately 45%, and approximately 50%.

Using the 4040 reverse osmosis unit 17, the typical feed rate of water was approximately 270 liters per hour, although the feed rate could reach 350 liters per hour. Using the same apparatus design as in FIG. 5, but with a Dow 8040 reverse osmosis membrane unit (20.32 cm diameter), the maximum flow rate is expected to be approximately 600-700 liters per hour, preferably 667 liters per hour. This allows processing of up to approximately 100 liters of purified water per hour with a single reverse osmosis membrane.

Figure 6:
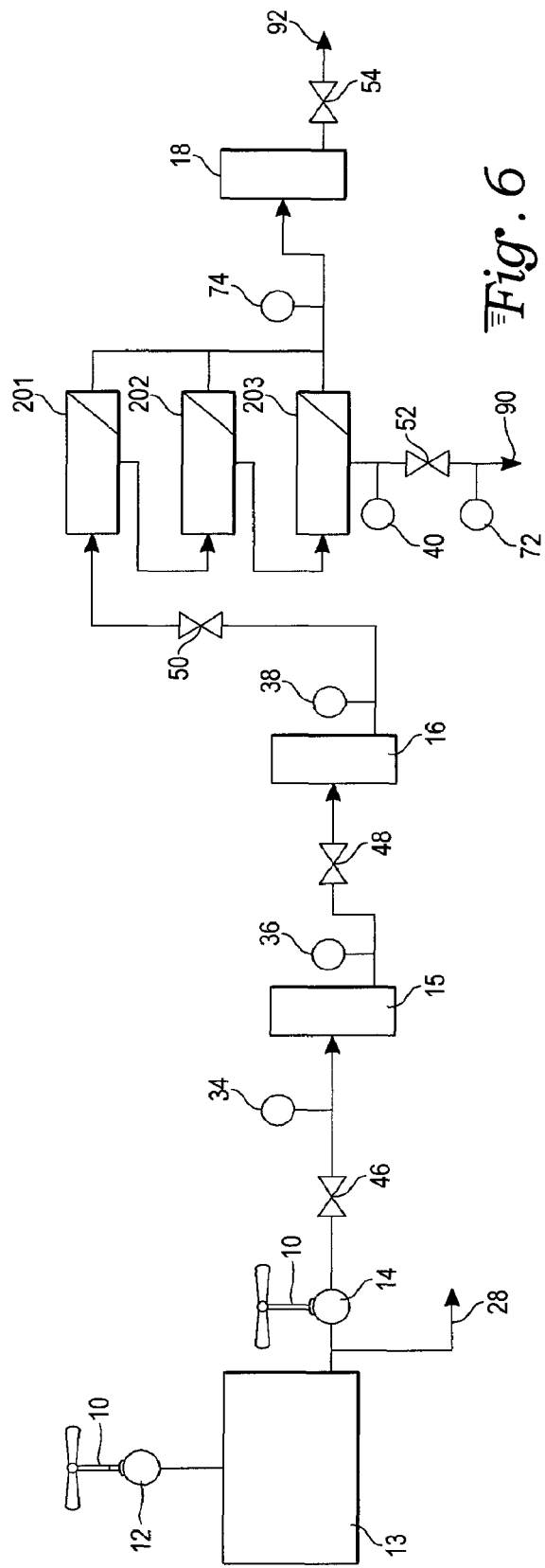
FIG. 6 is a schematic view of an alternative embodiment of the invention.

FIG. 6 shows another preferred embodiment of the invention using multiple reverse osmosis membrane units. To process more water, up to three 8040 reverse osmosis units 201, 202, and 203 are connected in series, wherein the waste water from the first reverse osmosis unit is used as the feedwater for the second reverse osmosis unit, and the waste from the second reverse osmosis unit is used as the feedwater for the third reverse osmosis unit. Three reverse osmosis units may be joined in series; using more than three units would require more pressure than could be produced by a hand pump.

EXAMPLES

Example 1

Operating the system described in FIG. 5, with a reverse osmosis unit DOW 4040, coupled with Ultra-Flow ultrafiltration filters, with a prefilter of 5 microns, an initial pressure of 4 bar (approximately 60 psi) was obtained with the system closed (no water exiting the system).

With the water outlets open, a flow or feed rate of 270 liters water per hour was achieved, with an outlet rate of approximately 40 liters per hour purified water.

Example 2

Using the same conditions as in EXAMPLE 1, beginning with raw water with a TDS of 75 ppm, purified water was obtained with a TDS of 4 ppm.

Example 3

Using the same conditions as in EXAMPLE 1, beginning with raw water with a TDS of 1230 ppm (using added NaCl), purified water was obtained with a TDS of 15 ppm. Using a recovery rate of 20%, a flow rate of only 5 liters per hour was obtained. Preferably, the water to be purified using the invention will have an initial TDS of approximately 600-1000 ppm to allow sufficient flow rate to be practical, though purification of water with higher TDS is possible.

Example 4

Using the same conditions as in EXAMPLE 1, beginning with raw water fluoride concentration of 6.8 ppm, purified water was obtained with a fluoride concentration of 1.6 ppm. Greater than 75 of the fluoride was removed.

It should be understood that the details of these examples and embodiments in this detailed description are exemplary. The device may be scaled and variations in the quantities of water used or produced are varied.

What is claimed is:

1. A hand pump comprising:
   a pump handle;
   a water intake;
   pump means responsive to motion of said pump handle for generating a liquid-draw pressure at said water intake and for applying a filtration-drive pressure to raw unfiltered water at a second pumping location within said pump means following release, at a first pumping location, of said raw unfiltered water from said liquid-draw pressure;
   a filter connected to receive said water to which said filtration-drive pressure is applied so as to provide filtration of said raw unfiltered water;
   a filtered outlet downstream of said filter to deliver filtered water; and
   an unfiltered outlet connected to a flow path within said pump means, said flow path providing said raw unfiltered water to said second pumping location for application of said filtration-drive pressure, said unfiltered outlet to deliver said raw unfiltered water from said first pumping location following said release from said liquid-draw pressure.

2. The hand pump of claim 1 wherein said pump means includes first and second pumps connected to said pump handle, said first pump having an intake chamber coupled to said water intake, said second pump being in spaced relation to said first pump, said flow path flowing said raw unfiltered water from said first pump to said second pump and providing said raw unfiltered water to said unfiltered outlet.

3. The hand pump of claim 2 wherein an output capacity of said first pump is greater than an output capacity of said second pump.

4. The hand pump of claim 2 wherein said pump handle is mounted for reciprocating motion, said first and second pumps being connected to said pump handle such that movement of said pump handle in a first direction operates said first pump to generate said liquid-draw pressure and movement in an opposite second direction operates said second pump to generate said filtration-drive pressure.

5. The hand pump of claim 1 wherein said filter includes an ultrafiltration cartridge, said filtration-drive pressure being sufficient motive force for driving said water through said ultrafiltration cartridge.

6. The hand pump of claim 5 wherein said filter further includes a reverse osmosis cartridge.

7. The hand pump of claim 1 wherein said water intake is connected to a pipe extending downwardly for extracting groundwater.

8. A hand-operated water supply system comprising:
   an intake pump having a first chamber for receiving raw unfiltered water in response to manual operation of said intake pump;
   a second pump having a second chamber from which said raw unfiltered water is driven in response to manual operation of said second pump;
   a hand-operated mechanism coupled to both of said intake and second pumps such that movements of said hand-operated mechanism provide pumping operations of said intake and second pumps;
   a flow path for said raw unfiltered water from said intake pump to said second pump, said flow path including a first outlet which releases said raw unfiltered water in excess of a volume driven by said second pump;
   at least one filter connected to receive said raw unfiltered water driven by said second pump; and
   a second outlet connected to said at least one filter to release filtered water.

9. The water supply system of claim 8 wherein said intake pump has a greater volumetric output capacity than said second pump.

10. The water supply system of claim 8 wherein said intake pump is in fluid communication with a source of brackish water, said first outlet being located to provide user access to a flow of said brackish water.

11. The water supply system of claim 8 wherein said at least one filter includes a third outlet for release of reject liquid following filtration.

12. The water supply system of claim 8 wherein said at least one filter applies ultrafiltration.

13. The water supply system of claim 12 wherein said ultrafiltration is implemented by tubular membranes supported in an arcuate condition.

14. A retrofit assembly for coupling to a water intake hand-pump operable by motion of a handle comprising:
   a second pump having an input and an output;
   coupling means for mechanically connecting said second pump to said handle such that said motion of said handle provides a pumping operation of said second pump and said water intake pump;
   flow path piping for providing fluid communication of raw unfiltered water between said water intake pump and said input of said second pump;
   an unfiltered water outlet included in said flow path piping and disposed to provide ready access to said raw unfiltered water when said retrofit assembly is coupled to said water intake pump; and
   a filter connected to said output of said second pump, said filter having a filtered water outlet.

15. The retrofit assembly of claim 14 wherein each of said water intake and second pumps is a positive displacement pump, said coupling means being configured such that said motion of said handle in a first direction generates liquid-draw pressure by said water intake pump, while said motion of said handle in a direction opposite to said first direction generates filtration-drive pressure by said second pump.

16. The retrofit assembly of claim 14 wherein said filter includes an ultrafiltration cartridge having pores with a pore size of less than 5 microns.

17. The retrofit assembly of claim 14 wherein said filter includes at least one ultrafiltration cartridge and at least one reverse osmosis cartridge.

18. The retrofit assembly of claim 14 wherein said coupling means includes a lever and a plurality of hinges.

19. The retrofit assembly of claim 14 wherein said second pump has a volumetric output capacity less than that of said water intake pump.

* * * * *